US012809913B2

(12) United States Patent
Aston et al.

(10) Patent No.: US 12,809,913 B2
(45) Date of Patent: Nov. 24, 2026

(54) METHODS AND SYSTEMS FOR USE IN PREPROCESSING IMAGE DATASETS

(71) Applicant: VANTOR SERVICES INC., Westminster, CO (US)

(72) Inventors: Victoria Aston, Louisville, CO (US); Beth Stein, Denver, CO (US)

(73) Assignee: VANTOR SERVICES INC., Westminster, CO (US)

( * ) Notice: Subject to any disclaimer, the term of this patent is extended or adjusted under 35 U.S.C. 154(b) by 43 days.

(21) Appl. No.: 18/952,520

(22) Filed: Nov. 19, 2024

(65) Prior Publication Data

US 2026/0140998 A1 May 21, 2026

(51) Int. Cl.
*G06F 16/55* (2019.01)

(52) U.S. Cl.
CPC .................................... *G06F 16/55* (2019.01)

(58) Field of Classification Search
CPC ...... G06F 16/55; G06V 10/457; G06V 10/00; G06V 20/00; G06V 30/00; G06V 40/00; G06V 2201/00; G06V 10/25; G06V 20/70
See application file for complete search history.

(56) References Cited

U.S. PATENT DOCUMENTS 10,755,103 B2 * 8/2020 Chang .................... G06V 20/42
11,854,203 B1 * 12/2023 Gafni ........................ G06T 7/70
2007/0177805 A1 * 8/2007 Gallagher .............. G06V 10/84
707/E17.026
2011/0262031 A1 * 10/2011 Zhou ..................... G06T 15/205
382/284
2014/0140610 A1 * 5/2014 Tu ........................ G06F 18/2155
382/159
2017/0206648 A1 * 7/2017 Marra .................... G01C 11/00
2018/0114068 A1 * 4/2018 Balasundaram .......... G06T 5/40
2020/0242153 A1 * 7/2020 Luo ...................... G06N 3/0442
2021/0264195 A1 * 8/2021 Ingram ............... G06F 16/5866
2023/0036967 A1 * 2/2023 Talapov ............... G06V 10/457
2023/0281824 A1 * 9/2023 Mei ........................ G06V 20/70
345/419
2023/0350951 A1 * 11/2023 Larlus ..................... G06F 17/16
2024/0013559 A1 * 1/2024 Sidak ..................... G06V 20/68
2025/0292455 A1 * 9/2025 Xiang ..................... G06T 11/10

* cited by examiner

*Primary Examiner* — Huawen A Peng
(74) *Attorney, Agent, or Firm* — Harness, Dickey & Pierce, P.L.C.

(57) ABSTRACT

Systems and methods for preprocessing images are provided. One example computer-implemented method includes accessing multiple images including a first object, a second object, and/or a third object; ranking the first object, second object, and third object based on rareness of the first object, the second object, and the third object; grouping ones of the multiple images for which the first object is labeled and the second object is unlabeled; identifying the second object as a threshold object, based on the second object ranking being a rarest unlabeled object in said group; for each of the images in the group, based on the first object being more rare than the threshold object: computing a convex hull, which surrounds the first object(s) included in the image; and modifying the image to omit a part of the image outside of the convex hull.

17 Claims, 4 Drawing Sheets

METHODS AND SYSTEMS FOR USE IN PREPROCESSING IMAGE DATASETS

GOVERNMENT CONTRACT

Figure 1:
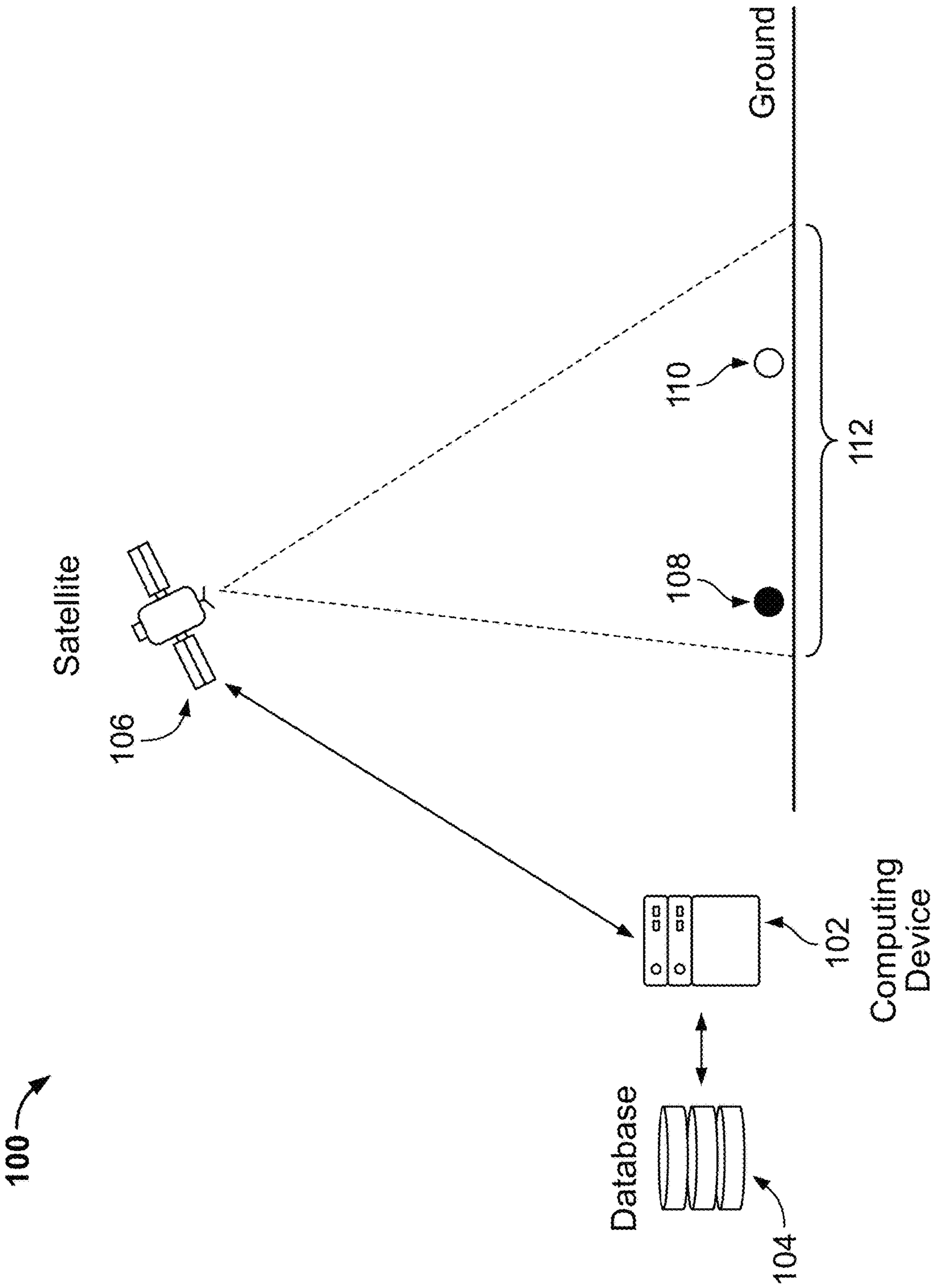

This invention was made with government support under NGA Contract No. 2021ATGMMS awarded by the National Geospatial-Intelligence Agency. The U.S. government may have certain rights in the invention.

FIELD

The present disclosure generally relates to methods and systems for use in preprocessing image datasets, and in particular, for use in combining disparate image datasets to limit, or eliminate, inconsistent object labeling between the disparate datasets.

BACKGROUND

This section provides background information related to the present disclosure which is not necessarily prior art.

Geospatial images are known to be captured by various capture devices, such as, for example, satellites, manned aerial vehicles (MAVs), unmanned aerial vehicles (UAVs), traffic cameras, handheld cameras, etc., from an elevated position, a ground level position, or otherwise. The images are generally associated with a location, and often include objects at the location. The objects may be labeled in the images, for example, by human review of the images. Object detection machine learning models may then be trained with the labeled images, i.e., as training images, whereby the machine learning models are configured to detect the objects in unlabeled images. Performance of the machine learning models in detecting the objects, and labeling the objects, is based on, for example, the types of the models, objects to be detected, accuracy of the object labeling in the training images, etc.

SUMMARY

This section provides a general summary of the disclosure, and is not a comprehensive disclosure of its full scope or all of its features.

Example embodiments of the present disclosure generally relate to methods (e.g., computer-implemented methods, etc.) for preprocessing image datasets to be used to train and/or evaluate machine learning models. In one example embodiment, such a method generally includes: accessing, by a computing device, multiple images including a first object, a second object, and/or a third object, in which ones of the first object, the second object and the third object are labeled; ranking, by the computing device, the first object, second object, and third object based on rareness of the first object, the second object, and the third object, whereby the first object being more rare than the second object, the second object being more rare than the third object; grouping, by the computing device, ones of the multiple images for which the first object is labeled and the second object is unlabeled; identifying, by the computing device, the second object as a threshold object, based on the second object ranking being a rarest unlabeled object in said group; for each of the images in the group, based on the first object being more rare than the threshold object: computing, by the computing device, a convex hull, which surrounds the first object(s) included in the image; and modifying, by the computing device, the image to omit a part of the image outside of the convex hull.

Example embodiments of the present disclosure also generally relate to non-transitory computer-readable storage media including executable instructions for preprocessing image datasets to be used to train machine learning models. In one example embodiment, such a non-transitory computer-readable storage medium includes executable instructions, which when executed by at least one processor, cause the at least one processor to: access the multiple images; rank the first object, second object, and third object based on rareness of the first object, the second object, and the third object; group ones of the multiple images together based on labeling schemes for the ones of the multiple images being consistent; for a first one of the group(s): identify one of the first object, the second object and the third object as a threshold object for being a rarest unlabeled object in said group; and for each image in said group: compute a convex hull, which surrounds ones of the first object(s), the second object(s) and the third object(s) in the image, which is/are more rare than the threshold object; and modify the image to omit a part of the image outside of the convex hull.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, are not all possible implementations, and are not intended to limit the scope of the present disclosure.

Figure 2A:
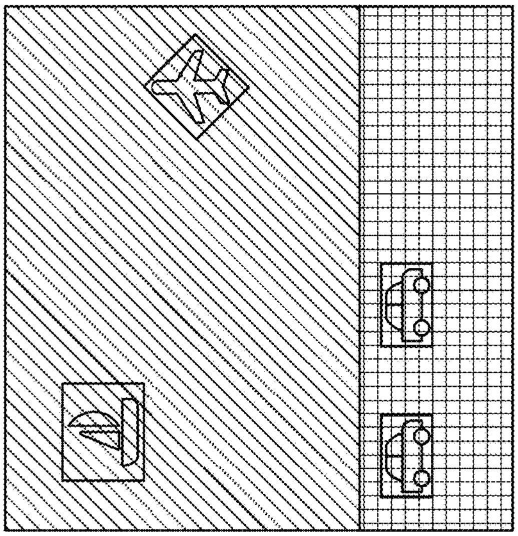
Figure 2B:
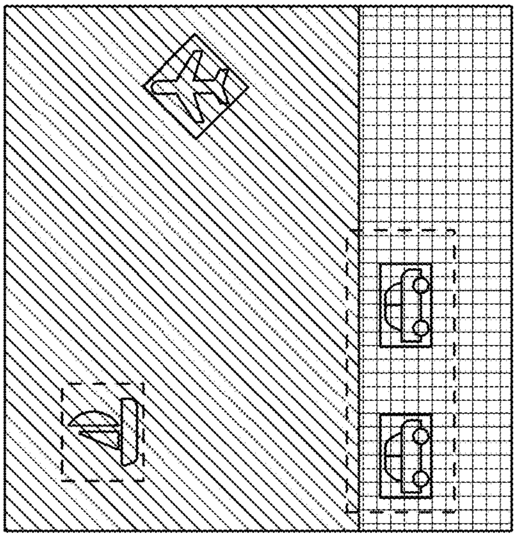
Figure 2C:
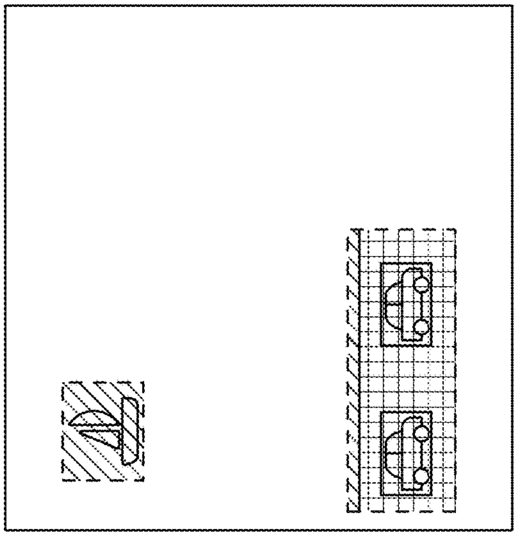
Figure 3:
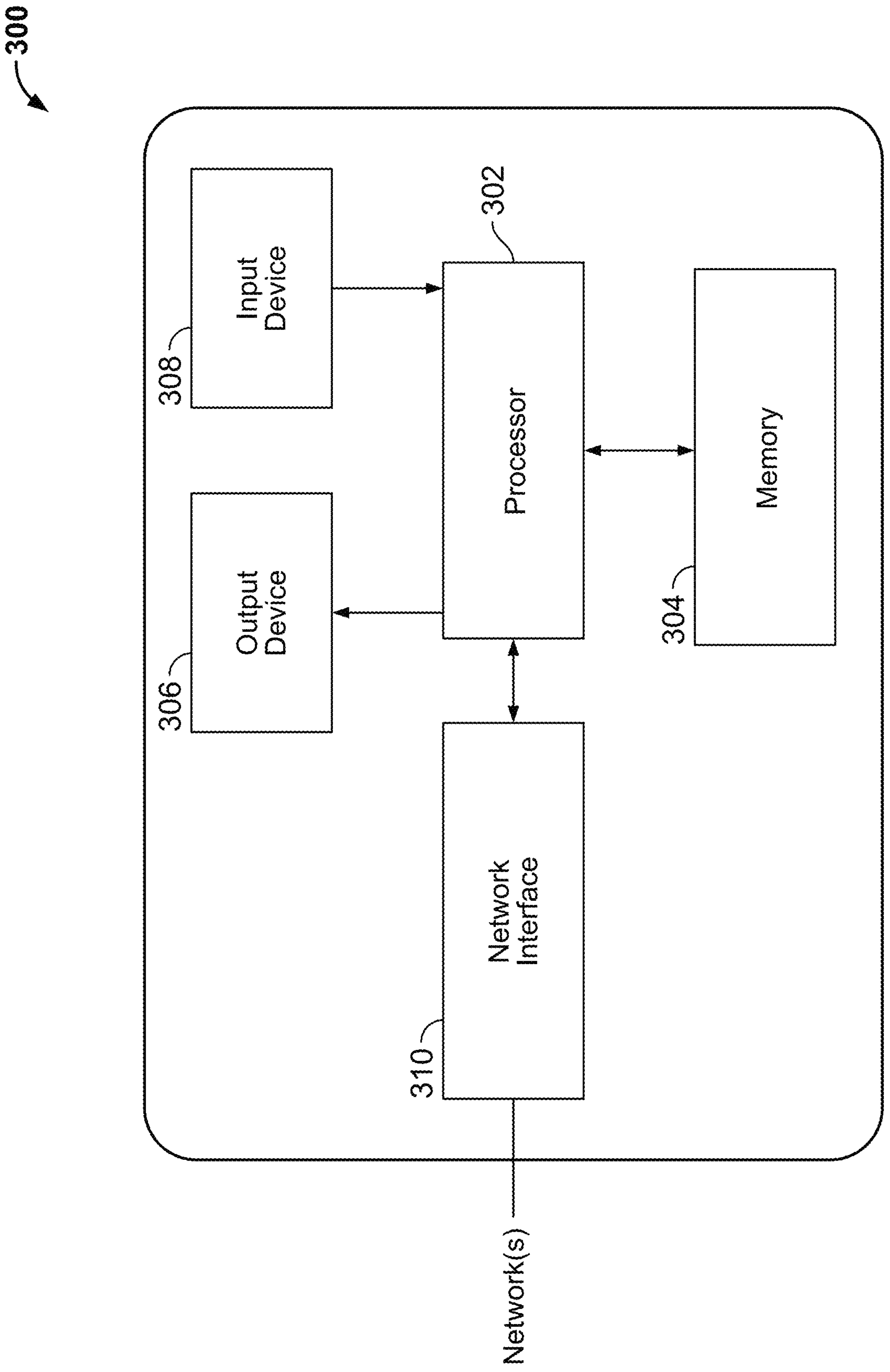
Figure 4:
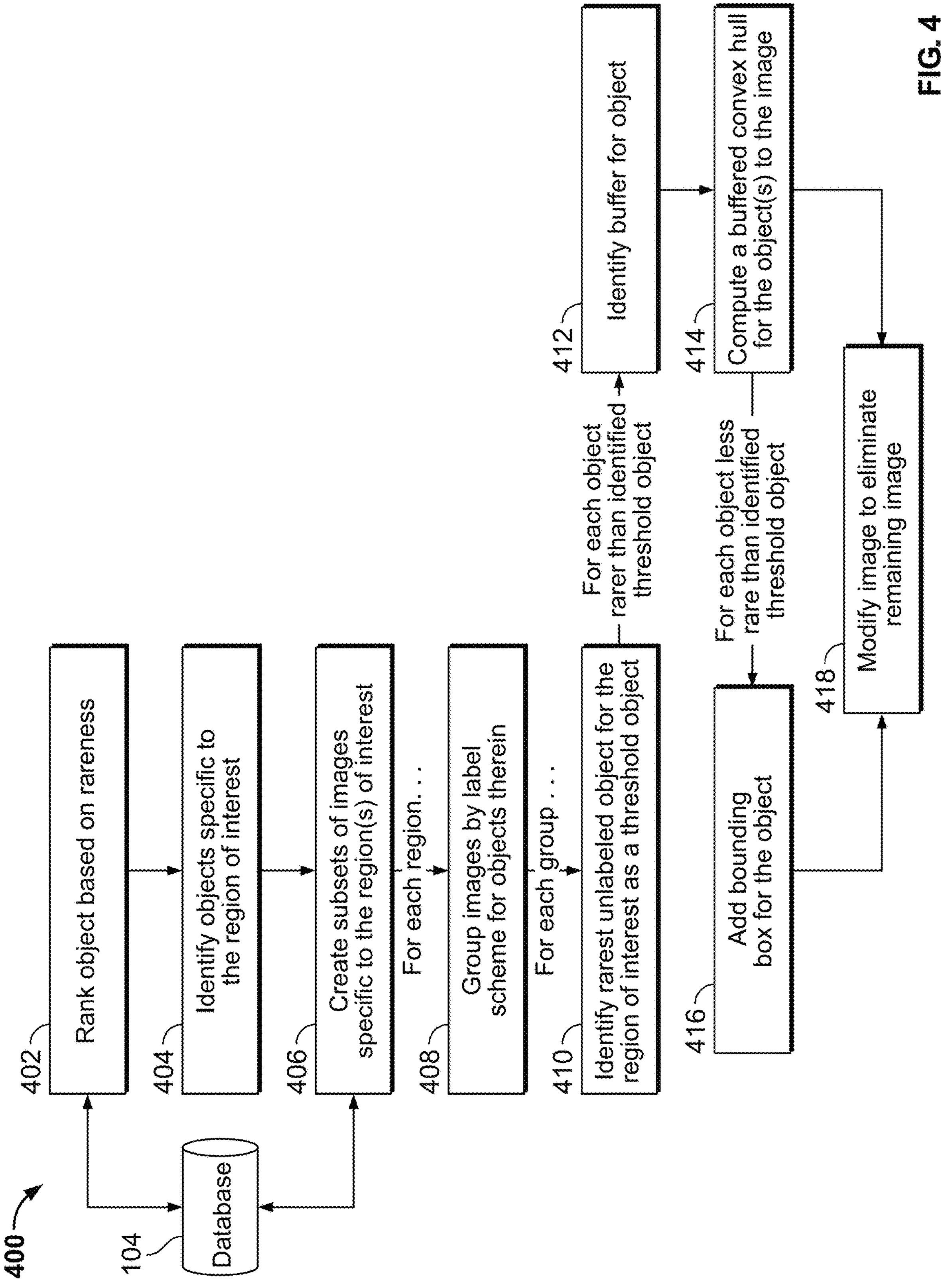

FIG. 1 illustrates an example system of the present disclosure configured for preprocessing image datasets to be used to train object detection machine learning models;

FIGS. 2A-2C include example images having unlabeled and labeled objects therein, and illustrating application of the preprocessing features of FIG. 1;

FIG. 3 is a block diagram of an example computing device that may be used in the system of FIG. 1; and FIG. 4 illustrates an example method, which may be used in (or implemented in) the system of FIG. 1, for use in preprocessing image datasets to be used to train machine learning models.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

In connection with training machine learning models, accuracy of training datasets is important. Image datasets may be compiled from different sources, whereby the datasets are disparate in one way or another. For example, a first dataset may include labels for only a first group of objects (e.g., boats, cars, trains, etc.), while a second dataset may include labels for a second group of objects (e.g., a boat, a car, a plane, a train, etc.). In this way, in the first dataset, planes are unlabeled even if present in the images, which may be considered false negatives in identifying the plane (s). This may occur where the second dataset was labeled for a project after identifying "planes" as objects of interest to be labeled, or where the second dataset was labeled for a different project, previously, concurrently, or subsequently, in which the "planes" were simply not to be labeled. It should be appreciated that as datasets are labeled for different objects, different purposes/projects, etc., the labeling across multiple datasets may be inconsistent, which, in turn, results in errant training of machine models trained on a combination of such disparate datasets. Conventionally, the datasets have been combined into a training dataset regardless of the disparity (which results in inaccurate training, by introduction of false negatives), while other datasets have been wholly discarded (which results in loss of valuable data and contextual information), and still other datasets have been relabeled (which results in a substantial investment of resources, in time and cost).

Uniquely, the systems and methods herein provide for preprocessing image datasets (e.g., disparate image datasets, etc.) to be used to train machine learning models.

In particular, images are compiled into subsets of images of a region of interest, for example. The objects in the images are grouped and ranked, based on rareness of the objects. From the ranking, a threshold object is identified, whereby a convex hull (or similar) is computed for objects more rare than the threshold object. The image is then modified to eliminate the image outside of the convex hull (and potentially, bounding boxes or similar for other labeled objects), i.e., selected regions of the image.

In this way, the more rare objects are retained in the images, which form a training dataset for one or more models, along with the context provided by the convex hull. As such, the training datasets subject to the processing described herein improve machine learning model accuracy by maximizing the valuable or more rare labels in the training dataset, while minimizing the number and severity of the unlabeled objects. By cropping, masking, etc., the regions outside of the selected regions, the systems and methods herein reduces the number of false negatives in training datasets. False negatives in the training datasets negatively impact a model's ability to recognize objects of interest, thus decreasing model performance and recall. Also, by retaining the background pixels within the selected regions (e.g., through the convex hull, etc.), valuable contextual information is retained, which aids in the trained model becoming more generalizable and performing better on unseen images. This provides a technical improvement, as the input images are transformed through the unconventional rules and processing described herein to define improved training datasets, which results in improvements in training machine learning and other models.

FIG. 1 illustrates an example system 100 in which one or more aspects of the present disclosure may be implemented. Although the system 100 is presented in one arrangement, other embodiments may include the parts of the system 100 (or additional parts) arranged otherwise depending on, for example, sources and/or types of image data, types of image capture devices, geospatial locations, privacy rules and/or regulations, etc.

In the example embodiment of FIG. 1, the system 100 generally includes a computing device 102 and a database 104, which is coupled to (and/or is otherwise in communication with) the computing device 102, as indicated by the arrowed line. The computing device 102 is illustrated as separate from the database 104 in FIG. 1, but it should be appreciated that the database 104 may be included, in whole or in part, in the computing device 102 in other system embodiments.

The database 104 includes multiple different datasets of images, from one or more different sources. The images generally include a background, such as, for example, a terrain associated with a geospatial location and also one or more objects, or no objects, located at that location. It should be understood that images may include photographs (e.g., captured by a capture device, etc.), but may also (or alternatively) include any type of picture with location-based information, including cartoons or drawings associated with particular regions, images captured from video, etc. The images may include one or more plan views, elevational views, perspective views, etc., of the one or more objects (at one or more locations). The views, generally, are based on a location of a capture device, relative to the one or more objects included in the images.

In this example embodiment, the system 100 includes a satellite 106, which is representative of multiple different satellites orbiting the Earth (e.g., in space, outside the Earth's atmosphere, etc.) and configured to capture various images of the surface of the Earth. One example satellite system, which may include the satellite 106, includes the MAXAR constellation of satellites (e.g., QuickBird or World View-series satellite constellation, etc.), or other constellation of satellites, such as, for example, the Landsat satellite constellation, the Sentinel-2 satellite constellation, etc.

The satellite 106, in this manner, is configured to capture images of the ground at different resolutions, at one or more different intervals. That is, the satellite 106 is configured to capture one or more images of the ground, at an interval of once per N days, for example, where N may include one day (i.e., daily), two days, five days, seven days (i.e., weekly), ten days, or other number of days therebetween, or other number of days more than ten days, etc. Also, the images may be captured at one or more different resolutions, depending on the particular satellite 106 employed in capturing the images. In one example, the images may include a resolution of about 10 meters by 10 meters per pixel, while in another example, the images may include a resolution of about three meters by three meters, etc. In still other examples, the resolution may be higher, or lower, again, depending on the satellite 106 (or other apparatus) employed in capturing the images.

Once the image(s) are captured, the satellite 106 is configured to transmit the images, directly or indirectly, to the database 104, which is located on Earth (or on the ground). The images may be transmitted, as each is captured, or the images may be transmitted at one or more intervals, singularly or in batches, etc. The images are then stored in the database 104 and made available to the computing device 102.

In this example embodiment, the satellite 106 is configured to capture hundreds or thousands of images of various geospatial locations during various intervals. As such, for the satellite 106, which again may be representative of multiple satellites, the database 104 includes thousands, hundreds of thousands, millions, tens of millions, or more or less, etc., images of various locations across the Earth.

While the satellite 106 is included in the system 100, it should be appreciated that other image capture devices may be used in other system embodiments, including, for example, unmanned aerial vehicles (UAVs) (e.g., drones, etc.), manned or micro area vehicles (MAVs), fixed mounted cameras, handheld cameras or other devices sufficiently positioned to capture images of a geospatial location singularly, or repeatedly over various intervals. For example, drones may be used to capture images of specific geospatial locations, at specific resolutions (e.g., which may not be available from the satellite 106, etc.), while mounted cameras may capture images of vehicle traffic/movement, metropolitan areas, neighborhoods, nature preserves, wildlife, facility activities (e.g., commercial or military assets, etc.), etc. Similarly, for example, handheld cameras may be used to capture images of destinations, properties, etc. The additional capture devices, like the satellite 106, are configured to capture the images and to transmit, directly or indirectly, the images to the database 104. The database 104 is configured to store the images therein, based on one or more classifications (e.g., based on a geospatial location included in the image, etc.).

Generally, then, it should be understood that the database 104 may include any images of any geospatial location, either with one or more objects included, or not.

In this example embodiment, FIG. 1, for example, illustrates the view of the satellite 106 by dotted lines, at the time an image is captured, whereby objects 108, 110 are included in the image 112 captured by the satellite 106. It should be appreciated that the objects 108, 110 included in the image 112, for example, may be any object, including, without limitation, a human being (broadly, an animate object), a mountain (broadly, terrain, etc.), a vehicle (broadly, an inanimate object, etc.).

The images may then be reviewed, by machine or human intervention, to label objects included in the images. The labels may be specific to a project, such as, for example, a wildlife detection project, in which the objects include different species of animals (e.g., fish, birds, etc.) that are labeled while others are not labeled. In other examples, where the project is related to vehicle tracking, the objects may include different types of vehicles (e.g., passenger vehicles, cargo vehicles, military vehicles, etc.) that are labeled, while other objects are not labeled. Generally, there is some domain expertise associated with the geospatial locations of the images selected for the projects, which are then labeled specific to the project requirements (i.e., indicating which objects are to be labeled).

It should be appreciated that the projects may be different, or may change over time, whereby the list of objects to be labeled may include additional objects, or fewer objects, for different projects. Consequently, the datasets generated from the labeling for different projects are not generally consistent. As an example, related to wildlife, a project may be conceived to track bears and birds in a northwest region of the United States, whereby the objects include black bear, brown bear, bobcat, bald eagle and spotted owl. As part of that project, then, five hundred images are labeled for the objects of interest. Subsequently, a new project is conceived to track endangered birds of the Pacific Northwest United States, where the objects are bald eagles, spotted owls, and Canadian geese. In this example, two hundred images are labeled for the objects. Consequently, two disparate datasets of images are formed, based on the different labels applied. That is, the second dataset may include images of Canadia geese, which are unlabeled.

Disparate image datasets should not be understood to be limited to animals, or wildlife, but should be understood to include potentially any image datasets or objects, which have been labeled based on different criteria.

It should be further appreciated that the image datasets may additionally, or alternatively, include segmentation, and specifically, pixel-based segmentation masks. It should be appreciated that the segmentation may be used as a training dataset for machine learning models, similar to the use of labels included in images, whereby the descriptions herein of labeled images should be understood to be applicable to segmentation of images, including specific masks for semantic segmentation and/or instance segmentation. For example, in such images, segmentation includes, for each pixel, an assigned categorical value (e.g., 0=water, 1=forest, etc.) (e.g., similar to an object label, etc.).

The image datasets may be selected to train one or more machine learning models or other models. In connection therewith, in this exemplary embodiment, the computing device 102 is configured to preprocess the image datasets in a manner to limit, or eliminate, inclusion of unlabeled objects in the training images from the disparate image datasets.

Initially, the computing device 102 is configured to assess the image datasets which may be employed to train the model(s). The image datasets may be limited to a particular region of interest, or not, and may be limited to specific objects of interest, or not. In connection therewith, objects of interest are nonetheless defined. In an example described herein with regard to FIGS. 2A-2C, the objects of interest include cars, boats, and planes. As shown in FIG. 2A, for example, the image includes each of the objects, but only the cars and the boat are labeled, as indicated by the solid box around each object. That said, in other embodiments, the objects may include, without limitations, animals (e.g., dogs, cats, birds, etc.), plants (e.g., trees, algae, etc.), vehicles (e.g., cars, buses, trains, tanks, helicopters, planes, ships, etc.), terrain (e.g., water, lakes, desert, forest, urban, etc.), or any other suitable objects, etc. The objects may be general, or include specific types of objects (e.g., by species, model, features, size, etc.), etc.

As explained above, the image datasets may be disparate in labelling, whereby the images datasets are treated differently. When the image dataset(s) is not labelled for the objects of interest, the computing device 102 is configured to discard the image dataset from the training, validation, and/or test dataset(s), which is generally referred to herein as training datasets, or potentially, to include the image dataset when a geospatial location captured by the images is known not to include the objects of interest. In the later instance, the image dataset(s) provides background and contextual data for the regions included in the images. And, when the image dataset(s) is labeled for all of the objects of interest, the computing device 102 is configured to include the image datasets in the training set.

And, when the image dataset(s) is labeled for some, but not all, of the objects of interest, i.e., disparate image datasets, the computing device 102 is configured to selectively crop/retain the images, as describe below.

In particular, in this example embodiment, the computing device 102 is configured to rank the objects from rarest object to least rare object in the population of images in the database 104, in general, or specific to the region of interest. The ranking, generally, is based on a count of the occurrence of the objects being labelled in the images. For example, the ranking of the objects of interest in FIG. 2A is illustrated in Table 1.

TABLE 1

| | |
|---|---|
| 1 | Car |
| 2 | Plane |
| 3 | Boat |

As indicated, cars are the rarest object, followed by planes and then boats. It should be appreciated that the images upon which the counts are based may be specific to a geospatial region of interest, such as, for example, one or more cities, states, postal codes, counties, territories, countries, continents, or the whole globe, etc.

The computing device 102 is also configured to generate a list of known objects in the geospatial region, or region of interest. In generating the list, the computing device 102 may be configured to rely on domain expertise, as indicated by persons with knowledge of the region of interest, and additional information relevant to the region of interest, such as, for example, specific boundary definition(s) for the region of interest, or parts thereof, image geospatial location data, other historical images/label datasets for the region of interest, etc.

It should be appreciated that the ranking may also be determined, by the computing device 102, using domain knowledge of the specific area and/or through an object count of the existing data, as indicated above. Rankings generally do not include objects that are not of interest. Domain knowledge can be used to prioritize particular classes (e.g., break ties in object counts, etc.), determine optimal scales for geographic boundaries/regional definitions, determine whether to use local or global statistics for rarity, determine buffer size for convex hulls or bounding boxes (as described below), etc.

Next, for the images from the disparate image datasets, the computing device 102 is configured to define subsets of the images, which are specific to one or more regions of interest. The subsets then may be specific to one of the regions of interest as a whole, or to a part of the region of interest. The images from the disparate datasets are then included in the subsets of images, along with the labels associated with the images. The images, therefore, may include images only having objects consistent with the objects for the region or the objects of interest.

It should be appreciated that the ranking of the objects for rareness may be performed, in one or more embodiments, after the subsets of images are compiled. That is, it should be noted that the order of the operations herein may vary. The object ranking by rareness, for example, may be performed at a different time, but may be considered, in various embodiments, to be a prerequisite for buffering and cropping.

The computing device 102 is then configured to group consistently labeled images together. For example, as shown in FIG. 2A, the image includes a labelled boat, and two labeled cars (as indicated by the solid boxes), and unknown to the computing device 102, the image also includes a plane, which is unlabeled. As such, the image is grouped, by the computing device 102, with other images having labeled car(s) and boat(s), i.e., a car-boat label scheme. Other groups may include car-only labeled images, plane-only labeled images, boat-only labeled images, plane-car labeled images, boat-plane labeled images, and boat-car-plane labeled images, etc.

Next, the computing device 102 is configured to determine, for each of the grouping of images, the threshold object based on the ranking of objects. That is, the computing device 102 is configured to identify the rarest object, from the ranking, which is not labeled in the group of images. In the example grouping, which includes the image of FIG. 2A, the car is the first ranked object, which is included, but the plane is the second ranked object, which is not included. As such, the plane is the threshold object for the group of images.

For each image in the group (i.e., with labeled car(s) and labeled boat(s)), the computing device 102 is configured to compute a convex hull to surround the relevant labels/objects in the image (i.e., the labeled objects rarer than the threshold object(s)). The convex hull is a convex shape, which encompasses all, or some, of the labeled objects in the image. The convex hull may be added or overlaid onto the image(s), or the convex hull may be a vector file or text file separate from the image(s) and labels but associated to the same, via the geographic overlap. In this example, as shown in FIG. 2B, the computing device 102 is configured to append a buffered convex hull (shown as a dashed line) around the two car objects in the image. As shown, the convex hull preserves not only the objects of interest (i.e., the cars), but context in the multiple backgrounds of the image (as indicated by the different hatching). To be clear, where the image includes multiple objects, which are rarer than the threshold object(s), each of the multiple objects of the image are then included in the buffered (or unbuffered) convex hull, or optionally, multiple convex hulls may be computed (e.g., per object, etc.). The convex hull is buffered, in this example, by a number of pixels, which may be dependent on the type of object, region of interest, etc. In one example, the buffering includes N-pixels, where N is 5, 10, twenty, forty, fifty, one hundred, etc.

It should be appreciated that a buffered bounding box, or other shape, etc., may be used in lieu of the convex hull in one or more example alternative embodiments.

Next, the computing device 102 is configured to modify the image to only include the area within the buffered convex hull (i.e., a selected region of the image), which includes the car objects in the above example. Modifying the image may include cropping the images to the boundaries of the buffered convex hull, or masking pixels outside of the buffered convex hull (i.e., black fill or white fill the remaining image), etc. The modified image, based on the masking of the pixel(s) outside the convex hull, is illustrated in FIG. 2C. It should be understood that the cropping (broadly, the modifying), in this example, acts to discard, from the image, the objects and associated labels, if applicable, which are outside the convex hull.

It should be clear that while the computing of the convex hull and the modification of the image are indicated as separate operations in the above description, the operations may be combined in other examples, whereby the image of FIG. 2A is input to the computing device 102, which is configured to compute the convex hull and crop the image accordingly, to output FIG. 2C, whereby FIG. 2B may be omitted.

In addition, prior to modifying the image, the computing device 102 may be configured to (optionally) apply bounding boxes to the other labeled objects in the image, i.e., below the threshold object, or potentially, to recall, from memory, the bounding boxes for the other labeled objects, if, for example, the bounding boxes already exist. In this example, the computing device 102 may be configured to compute a bounding box for the boat object in the image, as shown in FIG. 2B. As above, the bounding box may be added or overlaid onto the image(s) (as shown as the dotted box in FIG. 2B (overlaid on the solid label box from FIG. 2A)), or the bounding box may be a vector file or text file separate from the image(s) and labels but associated to the same, via the geographic overlap. The bounding box, generally, is a box shape, which is the smallest box within which the object is contained (with generally less context or background as compared to the convex hull). The bounding box, in this example, is unbuffered. That said, buffering, consistent with the buffering above, may be applied to the bounding box in other embodiments, and shapes other than a box may be employed in other embodiments.

In an example in which the bounding box(es) is(are) computed for the images, the computing device 102 is further configured to modify the image to include only the buffered convex hull and the bounding box(es), as shown in FIG. 2C, with the remainder of the pixels being masked or cropped.

The computing device 102 is configured to then store the modified or refined image, in place of, or in addition to, the original image in the subset of images, along with the labels for cars and boats. In this way, the unlabeled plane in the image of FIG. 2A is generally deleted from the image, whereby a false negative is not included in the images, or the training dataset of which the image is a part.

The computing device 102 is configured to repeat the above for each image in the grouping of images, and the images in the subset, and for each subset, of images, in database 104 and/or for each of the images directed to the region of interest and/or having the labels of interest, and/or for each image to be used as a training image for a machine learning model.

Once each of the images is modified, if applicable, the computing device 102 is configured to store the modified images and labels as part of the training set of images and labels, and to indicate that the processing of the training set is complete. As such, the computing device 102 may be configured to then input the training set of the machine learning model for purposes of training the model.

FIG. 3 illustrates an example computing device 300 that may be used in the system 100 of FIG. 1. The computing device 300 may include, for example, one or more servers, workstations, personal computers, laptops, virtual machine devices, etc. In addition, the computing device 300 may include a single computing device, or it may include multiple computing devices located in close proximity or distributed over a geographic region, so long as the computing devices are specifically configured to operate as described herein. What's more, it should further be appreciated that the computing device may be configured consistent with one or more cloud, fog, and/or mist computing architectures.

In the example embodiment of FIG. 1, the computing device 102, the database 104, and the satellite 106 may include and/or be implemented in one or more computing devices consistent with computing device 300. However, the system 100 should not be considered to be limited to the computing device 300, as described below, as different computing devices and/or arrangements of computing devices may be used. In addition, different components and/or arrangements of components may be used in other computing devices.

As shown in FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. In connection therewith, the memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 304 is configured to store data including, without limitation, images, lists of objects, labels, segmentation masks, and/or other types of data (and/or data structures) suitable for use as described herein.

Furthermore, in various embodiments, computer-executable instructions may be stored in the memory 304 for execution by the processor 302 to cause the processor 302 to perform one or more of the operations described herein (e.g., one or more of the operations of method 400, etc.) in connection with the various different parts of the system 100, such that the memory 304 is a physical, tangible, and non-transitory computer readable storage media. Such instructions often improve the efficiencies and/or performance of the processor 302 that is performing one or more of the various operations herein, whereby such performance may transform the computing device 300 into a special-purpose computing device. It should be appreciated that the memory 304 may include a variety of different memories, each implemented in connection with one or more of the functions or processes described herein.

In the example embodiment, the computing device 300 also includes an output device 306 that is coupled to (and is in communication with) the processor 302 (e.g., a presentation unit, etc.). The output device 306 may output information (e.g., images, etc.), visually or otherwise, to a user of the computing device 300. It should be further appreciated that various interfaces (e.g., as defined by network-based applications, websites, etc.) may be displayed or otherwise output at computing device 300, and in particular, at output device 306, to display, present, etc., certain information to the user. The output device 306 may include, without limitation, a liquid crystal display (LCD), a light-emitting diode (LED) display, an organic LED (OLED) display, an "electronic ink" display, speakers, a printer, etc. In some embodiments, the output device 306 may include multiple devices. Additionally, or alternatively, the output device 306 may include printing capability, enabling the computing device 300 to print text, images, and the like, on paper and/or other similar media.

In addition, the computing device 300 includes an input device 308 that receives inputs from the user (i.e., user inputs) such as, for example, selections of images, locations, desired characteristics, etc. The input device 308 may include a single input device or multiple input devices. The input device 308 is coupled to (and is in communication with) the processor 302 and may include, for example, one or more of a keyboard, a pointing device, a touch sensitive panel, or other suitable user input devices. It should be appreciated that in at least one embodiment the input device 308 may be integrated and/or included with the output device 306 (e.g., a touchscreen display, etc.).

Further, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network, etc.), including the network or other suitable network capable of supporting wired and/or wireless communication between the computing device 300 and other computing devices, including with other computing devices used as described herein (e.g., between the computing device 102, the database 104, etc.).

FIG. 4 illustrates an example method 400 for preprocessing disparate image datasets. The example method 400 is described herein in connection with the system 100, and may be implemented, in whole or in part, in the computing device 102 of the system 100. Further, for purposes of illustration, the example method 400 is also described with reference to the computing device 300 of FIG. 3. However, it should be appreciated that the method 400, or other methods described herein, are not limited to the system 100 or the computing device 300. And, conversely, the systems, models, and the computing devices described herein are not limited to the example method 400.

At the outset, it should be appreciated that the database 104 includes image datasets with numerous image subsets, which are labeled based on various criteria. As such, the image datasets include different labels for different objects in the different subsets of the images. In particular, in this example, a first dataset includes labels for objects A, B, and C, and a second dataset includes labels for objects A, B, C, and D, whereby the datasets are disparate, or broadly, at least partially differently labeled (i.e., including some unlabeled objects of interest). Each of the first and second datasets includes images of a region of interest, which is defined by a border (e.g., a governmental border, a climate region, a directional region (e.g., northeast, etc.), etc.), or radius from a specific geospatial location, etc.

What's more, a user desires to use the labeled images from the first and second dataset to train a model to detect the objects A, B, C, and D in the region of interest.

Consequently, the computing device 102 ranks, at 402, the objects A, B, C, and D, from rarest to least rare. The ranking is based on the occurrence of the objects in the combined images from the first and second datasets. That said, it should be appreciated that data other than the occurrences of the object may be employed, in combination therewith, to affect the ranking of the objects in the region of interest. For example, a user may modify, or not, the rankings based on the occurrences of the object(s), based on local statistics rankings in favor of those based on global statistics, domain expertise/opinion, or any combination of the above. For example, if object X is known to be abundant in Area 1 but rare in Area 2, and Y is equally present in both locations, it is possible that the user modifies the ranking to prioritize X higher in the Area 1 rankings because there are so few labels elsewhere, as compared to Y. Notwithstanding the additional bases for the ranking, in this example embodiment, the objects are ranked from rarest to least rare as [A, D, C, B].

In addition to the ranking, at 404, the computing device 102 also identifies the objects native to, or expected in, the region of interest. The objects may be identified through domain expertise, or regional data, for example, whereby certain objects are known to be in certain regions. For example, birds may be known to be present in a tropical region, while camels are known to be present in certain desert regions (while birds are not). It should be understood that the region of interest is the subject of fifty, one hundred, hundreds, or thousands, or more, of images, whereby the region is known to the user(s) associated with the training of the machine learning model. That said, it should be understood that the objects are not limited, again, to animals, or persons, for example. Vehicles, such as, for example, military vehicles, would be known to be in regions with military bases, or active military actions. Similarly, taxi cabs, buses, and trains would be known to be in urban regions.

Next, at 406, the computing device 102 creates subsets of the images from the first and second image datasets in the database 104 for the region of interest. The subsets include the images, an images identifier, and the object labels for the images. In the above example, the subsets including the example images may include those in the Table 2.

TABLE 2

| Image ID | Labels |
|---|---|
| Image_1 | B, C, D |
| Image_2 | A, B, C |
| Image_3 | B, C |
| Image_4 | A, B, C |
| Image_5 | A, D |
| . . . | . . . |

It should be appreciated that where there is more than one region of interest, the method 400, from step 406 forward, would be repeated individually for each region.

At 408, the images are grouped by the computing device 102, based on geographic region, and also the label scheme for the objects included in the images. In particular, with reference to the images in Table 2, like labels for the images are grouped together. As such, for example, image_2 and image_4 are for the same geographic region, and thus are grouped together as each includes the same labeling scheme, i.e., A, B, and C. Table 2, then, includes four groups, each having a unique set of labels (Group 1: B, C, D; Group 2: A, B, C; Group 3: B, C; and Group 4: A, D).

Next, at 410, for each group of images, the computing device 102 identifies the rarest unlabeled object, which, in turn, then is identified as the threshold object. For example, in the group including images_2 and image_4, the rarest unlabeled object is the object D, with object A being labeled and more rare than object D, and objects B, C being labeled yet less rare than object D.

As such, as shown in FIG. 4, at 412, the computing device 102 identifies a buffer for object A, based on, for example, a type of the object, a size of the object, an importance of context of the object, domain expertise, etc. The buffer can either be applied to the individual object labels before creating the convex hull, or the convex hull can be computed initially, and then buffered. Although the buffer size is dependent on, for example, the type of environment, heterogeneity of the environment, and proximity of surrounding objects, more than on object size, a general heuristic for buffer size may include, for example, approximately one to three times the size of the object, etc. The computing device 102 may include specific buffering to include sufficient adjacent pixels to provide environmental context as to the typical environment for the specific object. For example, with a vehicle, the buffering is selected to include at least a portion of the road or parking space, but does not need to be more substantial to include the entire road or parking lot. What's more, the buffering is not required to capture additional structures or environment, such as, for example, buildings in an urban environment or vegetation surrounding an unpaved road in a rural environment, etc. It is potentially beneficial, in various embodiments, to include adjacent context that is typical for the specific object and perhaps unique to it. For another object, such as, for example, a dog or other small/medium animal, the buffered region should include the environment, such as grass or trail, but only a small amount of these pixels are needed (i.e., there is no need to include the entire field or large segment of trail).

Once the buffer is identified, the computing device 102 computes, at 414, a convex hull for the object(s) D in the image_2, for example, where the convex hull is buffered by the identified buffer. The convex hull includes, as indicated above, a shape, which encompasses all of the object(s) D in the image_2, with the buffer extending around the boundary of the convex hull beyond the edges of the object(s). It should be appreciated that other shapes may be employed in other embodiments, including, for example, a buffered or unbuffered bounding box for the object(s), together or individually.

Next, at 416, the computing device 102 computes (or recalls, if existing) a bounding box for each object, which is beneath the threshold object, i.e., object D in this example. As such, the computing device 102 appends a bounding box to each of the objects B, C in the image_2. The bounding box includes a smallest box, which contacts at least one boundary of the object around which the bounding box is appended. It should be appreciated that in various embodiments, a limited buffer (e.g., one to a hundred, or two to fifty pixels, or based on the size of the object, etc.) may be applied, but no buffer is applied in the example method embodiment of FIG. 4.

Consequently, the image_2 includes a buffered convex hull for the object(s) A and bounding boxes for each of the objects B, C.

At 418, the computing device 102 then modifies the image_2, to eliminate the image(s) outside of the convex hull and the bounding boxes. This may include, for example, masking or cropping the pixels outside the hull and bounding boxes. By doing so, the computing device 102 crops out the images outside of the hull and bounding boxes, which may or may not include the rarest unlabeled object, while retaining, in this example, the dimensions of the image_2. It should be appreciated that in other embodiments, the hull, bounding boxes and respective labels may be pulled out of the image_2, and saved, thereby modifying the image.

The steps 412-418 are repeated for each of the images in the group, and then, steps 410-418 are repeated for the next groups (based on label scheme), and the images included therein.

It should be appreciated that the images, as modified, are stored in the database 104. Subsequently, the modified images are included in a training set of images for a machine learning model, whereby the labeled object(s) in the images are preserved with limited false negative data (i.e., unlabeled objects of interest) included therein.

In view of the above, the systems and methods herein provide for preprocessing of images, prior to a machine learning model training for object detection, or other purpose. The preprocessing includes the limitation of unlabeled objects in the training images, through enforcing a threshold, for groups of images. The threshold is employed to define objects/labels/masks to be retained in the images, and the amount of background or context to be retained with the objects. In this way, the available images are enabled to be used for training purposes despite the presence of unlabeled objects in the images, given that the images, and especially the rarest objects therein (e.g., based on ranking, etc.), are rehabilitated and included in the training set, through the above efficient process, without requiring the images to be relabeled.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure may transform a general-purpose computing device into a special-purpose computing device when configured to perform one or more of the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) accessing, by a computing device, multiple images including a first object, a second object, and/or a third object, in which ones of the first object, the second object and the third object are labeled; (b) ranking, by the computing device, the first object, second object, and third object based on rareness of the first object, the second object, and the third object, whereby the first object being more rare than the second object, the second object being more rare than the third object; (c) grouping, by the computing device, ones of the multiple images for which the first object is labeled and the second object is unlabeled; (d) identifying, by the computing device, the second object as a threshold object, based on the second object ranking being a rarest unlabeled object in said group; and/or (e) for each of the images in the group, based on the first object being more rare than the threshold object: (f) computing, by the computing device, a convex hull, which surrounds the first object(s) included in the image; and/or (g) modifying, by the computing device, the image to omit a part of the image outside of the convex hull.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above-mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being “on,” “engaged to,” “connected to,” “coupled to,” “associated with,” “in communication with,” or “included with” another element or layer, it may be directly on, engaged, connected or coupled to, or associated or in communication or included with the other feature, or intervening features may be present. As used herein, the term “and/or” and the phrase “at least one of” includes any and all combinations of one or more of the associated listed items.

Although the terms first, second, third, etc. may be used herein to describe various features, these features should not be limited by these terms. These terms may be only used to distinguish one feature from another. Terms such as “first,” “second,” and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in preprocessing images, the method comprising:

accessing, by a computing device, multiple images each including a first object, a second object, and/or a third object, in which ones of the first object, the second object, and the third object are labeled and ones of the first object, the second object, and the third object are unlabeled;

ranking, by the computing device, the first object, second object, and third object based on rareness of occurrence(s) of the first object, the second object, and the third object in the multiple images, whereby the first object being more rare than the second object, the second object being more rare than the third object;

grouping, by the computing device, ones of the multiple images for which the first object is labeled and the second object is unlabeled;

identifying, by the computing device, the second object as a threshold object, based on the second object ranking being a rarest unlabeled object in said group of the ones of the multiple images;

for each of the images in the group, based on the first object being more rare than the threshold object:

computing, by the computing device, a convex hull, which surrounds the first object(s) included in the image; and modifying, by the computing device, the image to omit a part of the image outside of the convex hull.

2. The computer-implemented method of claim 1, wherein ranking the first object, second object, and third object is based on rareness of the first object, second object, and third object in a geospatial region; and wherein each of the multiple images includes a location within the geospatial region.

3. The computer-implemented method of claim 1, further comprising creating a subset of images from the multiple images based on a region of interest; and wherein grouping one of the multiple images includes grouping ones of the multiple images from the subset of images.

4. The computer-implemented method of claim 1, further comprising, for each of the multiple images in the group, and based on the third object being less rare than the threshold object:

adding, by the computing device, a bounding box to the third object(s) in the image; and wherein modifying, by the computing device, the image includes modifying, by the computing device, the image to omit the part of the image outside the convex hull and the bounding box(es).

5. The computer-implemented method of claim 4, wherein modifying the image includes cropping or masking the image outside the convex hull and the bounding box(es).

6. The computer-implemented method of claim 1, wherein the convex hull is a buffered convex hull, which surrounds all of the first object(s) included in the image.

7. The computer-implemented method of claim 1, further comprising, after modifying each of the images in the group, training a machine learning model based on the modified images.

8. A system for use in preprocessing images, the system comprising:

a memory including multiple images, which each include a first object, a second object, and/or a third object, in which ones of the first object, the second object and the third object are labeled and ones of the first object, the second object, and the third object are unlabeled; and at least one processor configured, by executable instructions, to:

access the multiple images;

rank the first object, second object, and third object based on rareness of occurrence(s) of the first object, the second object, and the third object in the multiple images;

group ones of the multiple images together based on labeling scheme for the ones of the multiple images being consistent;

for a first one of the group(s):

identify one of the first object, the second object and the third object as a threshold object for being a rarest unlabeled object in said group; and for each image in said group:

compute a convex hull, which surrounds ones of the first object(s), the second object(s) and the third object(s) in the image, which is/are more rare than the threshold object; and modify the image to omit a part of the image outside of the convex hull.

9. The system of claim 8, wherein the at least one processor is configured, by the executable instructions, to rank the first object, the second object, and the third object based on rareness of the first object, the second object, and the third object in a geospatial region; and wherein each of the multiple images includes a location within the geospatial region.

10. The system of claim 8, wherein the at least one processor is further configured, by the executable instructions, to creating a subset of images from the multiple images based on a region of interest; and wherein the at least one processor is configured, by the executable instructions, to group the ones of the multiple images from the subset of images.

11. The system of claim 8, wherein the at least one processor is further configured, by the executable instructions, to, for each of the multiple images in the group, add a bounding box to ones of the first object(s), the second object(s) and the third object(s) in the image, which is/are less rare than the threshold object; and wherein the at least one processor is configured, by the executable instructions, to modify the image to omit the part of the image outside the convex hull and the bounding box(es).

12. The system of claim 8, wherein the convex hull is a buffered convex hull, which surrounds ones of the first object(s) included in the image.

13. The system of claim 8, wherein the at least one processor is configured, by the executable instructions, to modify the images by masking pixels of the images outside of the convex hull.

14. A non-transitory computer-readable storage medium comprising executable instructions for use in preprocessing images, prior to training a machine learning model, which when executed by at least one processor, cause the at least one processor to:

access multiple images, from a memory, the multiple images including a first object, a second object, and/or a third object, in which ones of the first object, the second object and the third object are labeled and ones of the first object, the second object, and the third object are unlabeled;

rank the first object, second object, and third object based on rareness of occurrence(s) of the first object, the second object, and the third object in the multiple images;

group ones of the multiple images together based on labeling schemes for the ones of the multiple images being consistent;

for a first one of the group(s):

identify one of the first object, the second object and the third object as a threshold object for being a rarest unlabeled object in said group; and for each image in said group:

compute a convex hull, which surrounds ones of the first object(s), the second object(s) and the third object(s) in the image, which is/are more rare than the threshold object; and modify the image to omit a part of the image outside of the convex hull.

15. The non-transitory computer-readable storage medium of claim 14, wherein the executable instructions, when executed by the at least one processor, cause the at least one processor, to rank the first object, the second object, and the third object based on rareness of the first object, the second object, and the third object in a geospatial region.

16. The non-transitory computer-readable storage medium of claim 14, wherein the executable instructions, when executed by the at least one processor, cause the at least one processor, to, for each of the multiple images in the group, add a bounding box to ones of the first object(s), the second object(s) and the third object(s) in the image, which is/are less rare than the threshold object; and wherein the at least one processor is configured, by the executable instructions, to modify the image to omit the part of the image outside the convex hull and the bounding box(es).

17. The non-transitory computer-readable storage medium of claim 14, wherein the convex hull is a buffered convex hull, which surrounds all of the first object(s) included in the image.

* * * * *